(12) United States Patent
Shinagawa

(10) Patent No.: US 9,897,155 B2
(45) Date of Patent: Feb. 20, 2018

(54) BRAKE DISK

(71) Applicant: Sunstar Engineering Inc., Takatsuki-shi, Osaka (JP)

(72) Inventor: Yoshinori Shinagawa, Takatsuki (JP)

(73) Assignee: SUNSTAR ENGINEERING INC., Takatsuki-shi, Osaka (JP)

( * ) Notice: Subject to any disclaimer, the term of this patent is extended or adjusted under 35 U.S.C. 154(b) by 0 days.

(21) Appl. No.: 14/381,501

(22) PCT Filed: Jan. 29, 2013

(86) PCT No.: PCT/JP2013/051852
§ 371 (c)(1),
(2) Date: Aug. 27, 2014

(87) PCT Pub. No.: WO2013/129005
PCT Pub. Date: Sep. 6, 2013

(65) Prior Publication Data
US 2015/0047932 A1 Feb. 19, 2015

(30) Foreign Application Priority Data

Feb. 28, 2012 (JP) ................................ 2012-041019

(51) Int. Cl.
*F16D 65/12* (2006.01)
*F16D 65/02* (2006.01)
*F16D 69/00* (2006.01)

(52) U.S. Cl.
CPC ........... *F16D 65/123* (2013.01); *F16D 65/12* (2013.01); *F16D 2065/136* (2013.01);
(Continued)

(58) Field of Classification Search
CPC .................. F16D 65/123; F16D 2065/1392
(Continued)

(56) References Cited

U.S. PATENT DOCUMENTS 2,269,573 A * 1/1942 Adelbert ..................... 33/734
2,753,959 A * 7/1956 Johnson ................. 188/218 XL
(Continued)

FOREIGN PATENT DOCUMENTS

JP 55-142129 A 11/1980
JP 59-117926 A 7/1984
(Continued)

*Primary Examiner* — Anna Momper
*Assistant Examiner* — Mahbubur Rashid
(74) *Attorney, Agent, or Firm* — Kratz, Qunitos & Hanson, LLP

(57) ABSTRACT

The present invention is to provide a brake disk capable of enhancing the turning performance of a motorcycle by reducing the inertia, and preventing deposition on a braking portion by reducing a temperature variation of the braking portion. A brake disk 1 is provided with a sliding disk 10, a hub disk 20, and a connection pin 31 for connecting the disks 10 and 20 to each other at plural positions in the circumferential direction of the brake disk 1. An engaging convex portion 12 projecting inwardly of the sliding disk 10 is formed on the sliding disk 10 at circumferential positions corresponding to the connection pins 31. An engaging concave portion 24 for receiving the engaging convex portion 12 is formed in the outer periphery of the hub disk 20. An insertion hole 12c for the connection pin 31 is formed in the engaging convex portion 12.

6 Claims, 5 Drawing Sheets

(52) U.S. Cl.
CPC ............ *F16D 2065/1316* (2013.01); *F16D 2065/1392* (2013.01); *F16D 2069/004* (2013.01); *F16D 2250/0084* (2013.01)

(58) Field of Classification Search
USPC ..................................... 188/218 XL, 218 R
See application file for complete search history.

(56) References Cited

U.S. PATENT DOCUMENTS

| | | | | |
|---|---|---|---|---|
| 3,412,836 | A * | 11/1968 | Wilmer ..................... | 192/107 R |
| 3,926,285 | A * | 12/1975 | Preller et al. .......... | 188/218 XL |
| 3,933,228 | A * | 1/1976 | Otto et al. ............. | 188/218 XL |
| 5,297,660 | A * | 3/1994 | Wiebelhaus et al. .. | 188/218 XL |
| 6,964,323 | B2 * | 11/2005 | Campbell ................... | 188/18 A |
| 6,988,598 | B2 * | 1/2006 | Williams ................ | F16D 65/12 |
| | | | | 188/18 A |
| 7,066,556 | B2 * | 6/2006 | Irie ..................... | B60B 27/0005 |
| | | | | 188/24.11 |
| 7,284,643 | B1 * | 10/2007 | Kao ........................ | F16D 65/12 |
| | | | | 188/218 XL |
| 7,654,365 | B2 * | 2/2010 | Lamb ....................... | F16D 65/12 |
| | | | | 188/18 A |
| 7,762,379 | B2 * | 7/2010 | Fujita ...................... | F16D 65/12 |
| | | | | 188/218 XL |
| 2004/0040802 | A1 * | 3/2004 | Veneziano ............ | F16D 65/128 |
| | | | | 188/218 XL |
| 2005/0252739 | A1 * | 11/2005 | Callahan ................. | F16D 65/12 |
| | | | | 188/218 XL |
| 2006/0000680 | A1 * | 1/2006 | Carminati et al. ..... | 188/218 XL |
| 2006/0175160 | A1 * | 8/2006 | Weiss ..................... | 188/218 XL |
| 2006/0185945 | A1 * | 8/2006 | Greppi et al. ......... | 188/218 XL |

FOREIGN PATENT DOCUMENTS

| | | |
|---|---|---|
| JP | 60-030836 A | 2/1985 |
| JP | 09-166168 A | 6/1997 |
| JP | 2002-295549 A | 10/2002 |
| JP | 2002-303342 A | 10/2002 |
| JP | 2006-336670 A | 12/2006 |
| JP | 2009-522513 A | 6/2009 |
| JP | 2009-287632 A | 12/2009 |
| WO | 2007/074488 A1 | 7/2007 |
| WO | 2008/090809 A1 | 7/2008 |

* cited by examiner

[Fig. 1]

[Fig. 2]
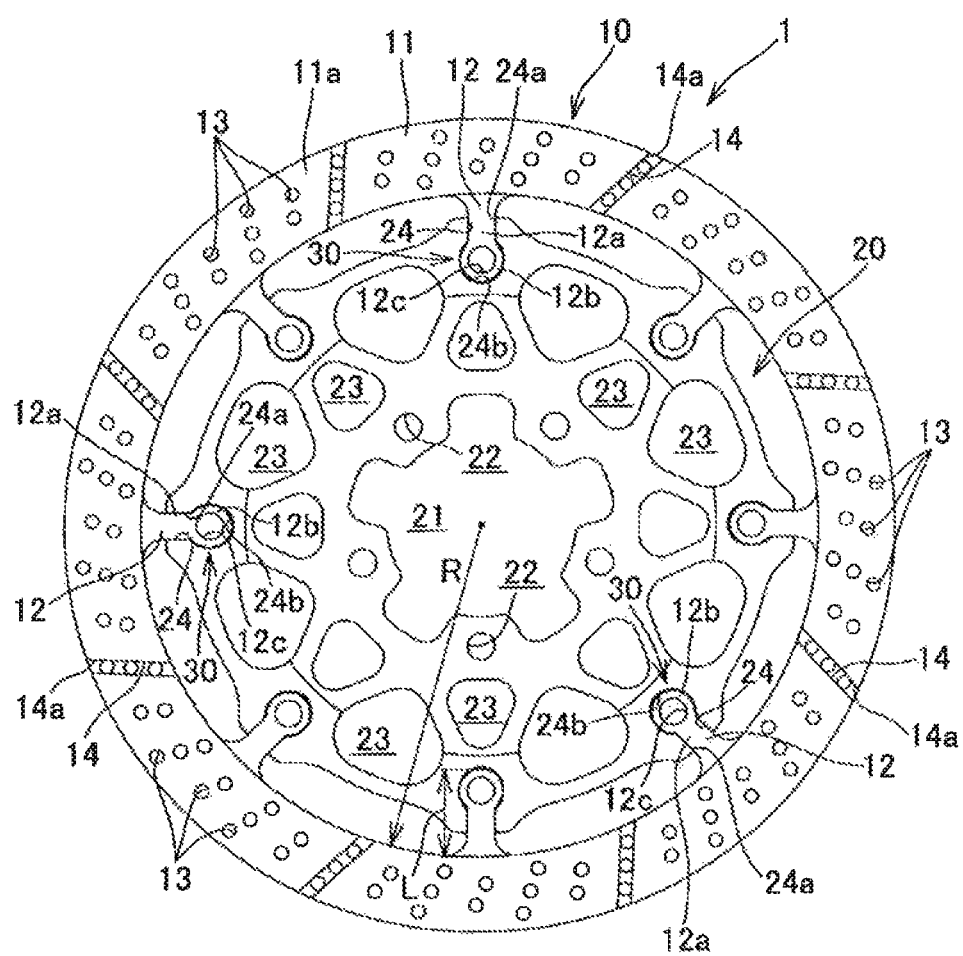

[Fig. 3]
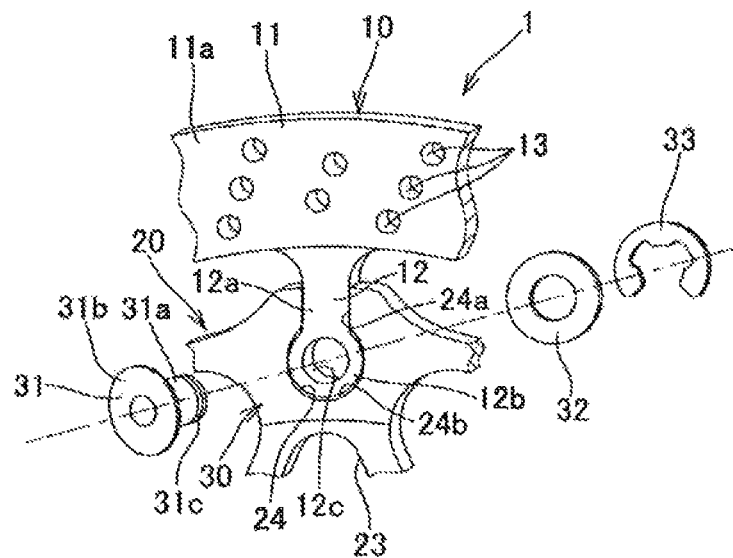
[Fig. 4]
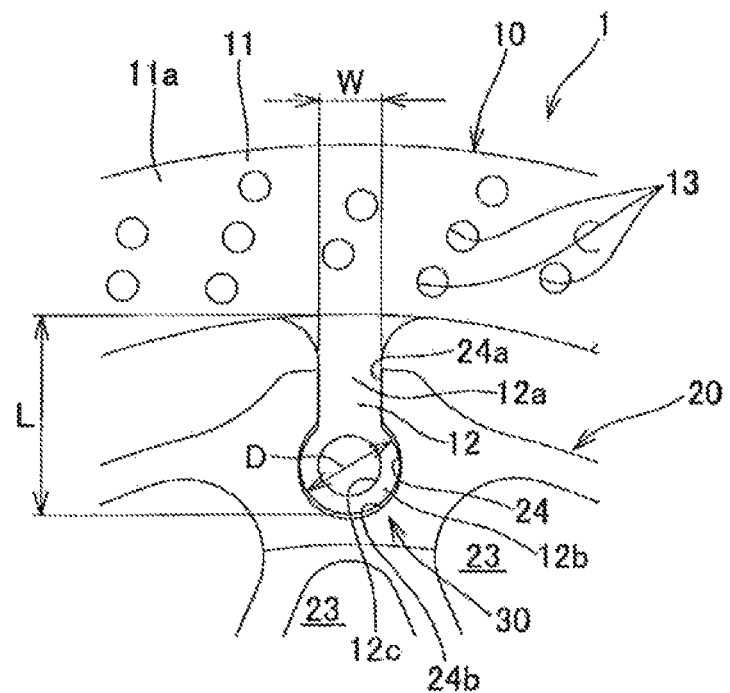

[Fig. 5]
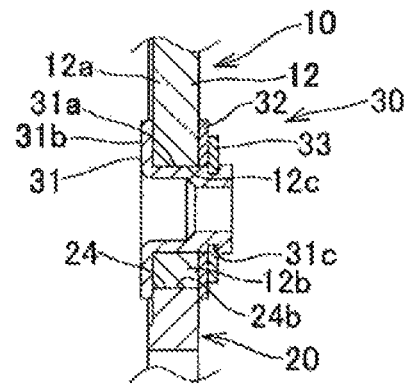
[Fig. 6]
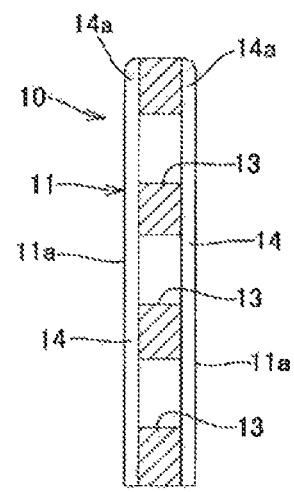
[Fig. 7]
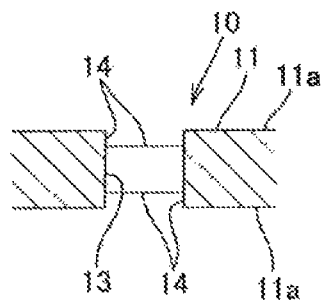

[Fig. 8]
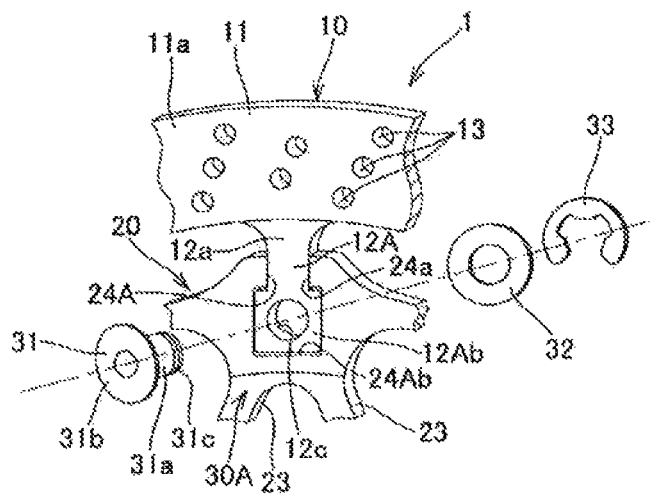
[Fig. 9]
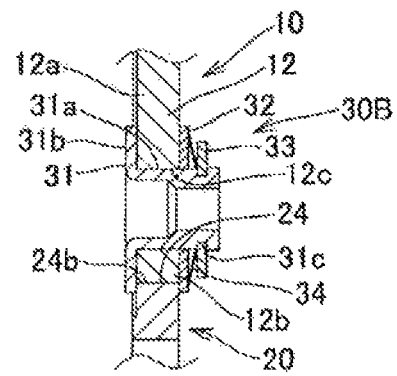
[Fig. 10]
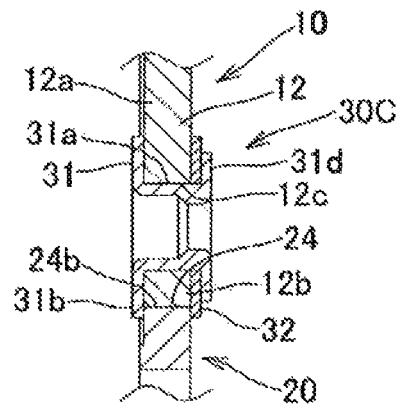

US 9,897,155 B2

BRAKE DISK

TECHNICAL FIELD

The present invention relates to a brake disk suitably usable for a motorcycle.

BACKGROUND ART

Generally, as a brake disk for a motorcycle, there have been widely put into practice a brake disk including a mounting portion for mounting a wheel, and a sliding portion which comes into sliding contact with a brake pad, and formed by press-forming a sheet of metal plate; and a so-called floating brake disk including an annular sliding disk having a sliding portion which comes into pressing contact with a brake pad, a hub disk to be mounted on the inner side of the sliding disk, and a plurality of connection means for connecting the disks to each other in a floating state.

As the floating brake disk, there has been widely put into practice a configuration, in which a semi-circular cutaway portion is formed in a sliding disk and in a hub disk at an abutment portion therebetween, and a connection pin is mounted in a circular-shaped connection hole to be defined by abutting the cutaway portions of the sliding disk and the hub disk, whereby the two disks are connected to each other (see e.g. Patent Document 1).

On the other hand, as a connection structure of two disks in a floating brake disk, there is proposed a configuration, in which an inwardly projecting engaging convex portion is formed on the inner periphery of the sliding disk, the hub disk is formed with an engaging concave portion for receiving the engaging convex portion in such a manner that the engaging convex portion and the engaging concave portion are unmovable relative to each other circumferentially and radially, an engageable connection plate of a substantially U-shape in section is mounted on the outer periphery of the hub disk, and the connection plate is connected to the hub disk by a pin member in a state that the engaging convex portion is inserted in the connection plate and is engaged in the engaging concave portion, whereby the two disks are connected to each other (see e.g. Patent Document 2). Further, there is proposed a connection structure, in which fixing plates are alternately disposed on one surface and the other surface of a plurality of engaging convex portions disposed circumferentially at a certain interval, in place of the connection plate, and two disks are supported by the fixing plates to be axially unmovable relative to each other (see e.g. Patent Document 3).

Further, there is proposed and put into practice a brake disk, in which one or more groove portions are formed in a sliding surface of a sliding disk which comes into sliding contact with a brake pad in order to prevent noise at the time of braking, and to clean the sliding surface of the sliding disk which comes into sliding contact with the brake pad (see e.g. Patent Document 4).

CITATION LIST

Patent Literatures

Patent Document 1: JP-A No. 2002-303342
Patent Document 2: JP-T No. 2009-522513
Patent Document 3: JP-A No. 2009-287632
Patent Document 4: JP-A No. 2002-295549

SUMMARY OF INVENTION

Technical Problem

In the case where a sliding disk and a hub disk are connected to each other by concave-convex engagement as described in the inventions of Patent Documents 2 and 3, it is possible to receive a braking load by the concave and convex engaging portions. Therefore, as compared with a configuration in which a braking load is received by a connection pin as described in Patent Document 1, the above configuration is advantageous in reducing the weight of the connection structure.

However, in the brake disk described in Patent Document 2, a connection plate is disposed on the outer periphery of the hub disk. Accordingly, the outer periphery of the brake disk of the connection structure is made heavy. This may increase the inertia. If the outer periphery of the brake disk is made heavy and the inertia is increased, in a motorcycle provided with the brake disk, a force of lifting the motorcycle body is acted when the motorcycle turns a curve. This may impair smooth cornering. In particular, the inertia is inevitably increased in a racing motorcycle in view of a point that the motorcycle turns a corner at a high speed. Thus, the turning performance may be considerably lowered.

Further, in the brake disk described in Patent Document 3, it is necessary to provide fixing plates of an even number, in view of a point that the fixing plates are alternately disposed circumferentially on both surfaces of the hub disk. This may narrow the degree of design freedom, and may lower the strength against an eccentric load with respect to the axial direction.

Further, in the brake disk described in Patent Document 1, an inwardly projecting projecting portion is formed on the sliding disk, and a semi-circular cutaway portion engageable with a connection pin is formed in the projecting portion. This increases the circumferential width of the projecting portion, and increases the heat capacity of the projecting portion. As a result, the temperature of the sliding disk is inevitably lowered at a position corresponding to the projecting portion. This may vary a temperature distribution of the sliding portion of the sliding disk, and a local temperature rise is likely to occur. As a result, so-called deposition such that a part of the sliding portion which comes into sliding contact with the brake pad is incited may occur in a severe use condition in a racing game.

An object of the invention is to provide a brake disk that enables to enhance the turning performance of a motorcycle by reducing the inertia, and to prevent deposition on a braking portion by reducing a temperature variation of the braking portion.

Solution to Problem

A brake disk of the invention is provided with an annular sliding disk including a sliding portion which comes into pressing contact with a brake pad, a hub disk disposed on an inner side of the sliding disk, and a connection pin which connects the sliding disk and the hub disk to each other at a plurality of positions in a circumferential direction of the brake disk. An engaging convex portion projecting inwardly of the sliding disk is formed on the sliding disk at circumferential positions corresponding to the connection pins. An engaging concave portion for receiving the engaging convex portion is formed in an outer periphery of the hub disk. An insertion hole for the connection pin is formed in the engaging convex portion. A restricting portion for restricting a relative movement between the sliding disk and the hub disk in an axial direction of the brake disk is formed on both ends of the connection pin.

In the brake disk having the above configuration, concave-convex engagement between the engaging convex portion of the sliding disk and the engaging concave portion of the hub disk makes it possible to restrict a relative movement between the disks circumferentially and radially. Further, the connection pin mounted in the insertion hole makes it possible to restrict a relative movement between the disks in the axial direction, whereby the brake disk functions as an integral brake disk. The brake disk is configured such that only a small radial relative movement between the disks is permitted so that thermal expansion of the sliding disk due to heat generation at the time of braking is absorbed.

In the brake disk having the above configuration, a main component of the braking load is received by the concave and convex engaging portions, and the braking load hardly acts on the connection pin. Accordingly, it is possible to use a small and lightweight connection pin as the connection pin. Further, unlike the connection pin described in Patent Document 1, it is possible to dispose the connection pin as a heavy member on the side of the center of rotation of the brake disk. This makes it possible to set the inertia of the brake disk to be small. The inertia can be set to be small as described above. Accordingly, in a motorcycle provided with the brake disk, high-speed cornering performance can be significantly enhanced. Further, unlike the brake disk described in Patent Document 1, it is possible to narrow the circumferential width of the projecting portion projecting inwardly from the sliding disk. This is advantageous in suppressing partial temperature lowering of the sliding portion corresponding to the circumferential position of the projecting portion, reducing a temperature variation of the sliding portion, preventing melting of the sliding portion due to a local temperature rise of the sliding surface, and effectively preventing deposition.

A preferable embodiment is such that an elongated plate-shaped neck portion is formed on a base portion of the engaging convex portion, a head portion of a width larger than a width of the neck portion is formed on a distal end of the engaging convex portion, a straight portion engageable with the neck portion is formed on an opening portion of the engaging concave portion, and a locking concave portion engageable with the head portion is formed in an inner portion of the engaging concave portion. According to the above configuration, concave-convex engagement between the locking concave portion and the head portion makes it possible to restrict radial movement of the engaging convex portion. Further, press contact of the neck portion with both side surfaces of the straight portion in the inner peripheral direction makes it possible to receive the braking load in a planar manner.

A preferred embodiment is such that a flange portion extending on a plane of the hub disk is formed on one end of the connection pin, and a washer extending on the plane of the hub disk is mounted on the other end of the connection pin in such a manner as to avoid disengagement. According to the above configuration, use of the connection pin having a simplified configuration makes it possible to hold the sliding disk and the hub disk to be unmovable relative to each other in the axial direction.

A preferred embodiment is such that a length of the engaging convex portion is set to be from 10 to 75% of an inner diameter of the sliding portion. According to the above configuration, it is possible to dispose the engaging convex portion on the side of the center of rotation of the brake disk, while preventing interference with a speed sensor to be disposed on the hub disk. Thus, it is possible to set the inertia of the brake disk to be small.

A preferred embodiment is such that the brake disk is further provided with a spring member which is disposed between one of the restricting portions of the connection pin and the hub disk for urging the sliding disk and the hub disk in such a manner that the sliding disk and the hub disk are disposed on one plane. According to the above configuration, it is possible to connect the sliding disk and the hub disk to each other in a floating state.

A preferred embodiment is such that a groove portion for cleaning is formed in a sliding surface of the sliding portion which comes into sliding contact with the brake pad in correspondence to a circumferentially middle portion between the engaging convex portions adjacent to each other. In other words, the temperature of a portion of the sliding surface where the groove portion is formed is likely to be lowered by an increase in the surface area of the portion. On the other hand, in the brake disk of the invention, the temperature of the sliding portion is likely to be lowered at a circumferential position corresponding to the engaging convex portion, and the temperature of the sliding portion is likely to rise at a circumferential position corresponding to the circumferentially middle portion between the engaging convex portions adjacent to each other. In view of the above, it is possible to lower the temperature of the target portion by forming the groove portion for cleaning in the circumferential position of the sliding surface where the temperature is likely to rise. This is advantageous in reducing a temperature variation of the sliding surface, and in preventing deposition on the sliding surface due to a local temperature rise.

A preferred embodiment is such that a plurality of lightening holes for reducing the weight of the brake disk are formed in the sliding portion, and the groove portion is formed in such a manner as to pass the lightening holes adjacent to each other. In the brake disk having the above configuration, a plurality of lightening holes is formed in the sliding portion. Accordingly, it is possible to reduce the weight of the brake disk, to enhance heat dissipation of the sliding portion, and to clean the surface of the brake pad by the opening perimeters of the lightening holes. This makes it possible to prevent lowering of the braking performance due to adhesion of foreign matter on the sliding surface with respect to the brake pad. Further, a groove portion is formed in such a manner as to transverse the sliding portion. Thus, forming the groove portion is also advantageous in reducing the weight of the brake disk, enhancing heat dissipation of the sliding portion, and enhancing the cleaning effect on the surface of the brake pad. In addition, a temperature variation of a portion between the lightening holes which are disposed adjacent and in proximity to each other is likely to increase, as compared with the other portion, because the heat capacity of the portion between the holes is reduced, as compared with the other portion. However, in the invention, a groove portion is formed in the portion between the holes. This avoids generation of frictional heat with respect to the brake pad due to direct contact of the portion between the holes with the brake pad. Accordingly, the above configuration is advantageous in suppressing generation of heat spots on the portion between the holes, preventing thermal shrinkage on the portion between the holes, and effectively preventing damage of the portion between the holes due to thermal shrinkage.

Advantageous Effects of Invention

According to the brake disk of the invention, a main component of the braking load is received by the concave and convex engaging portions, and the braking load hardly acts on the connection pin. Accordingly, it is possible to use a small and lightweight connection pin as a connection pin. Further, unlike the connection pin described in Patent Document 1, it is possible to dispose the connection pin as a heavy member on the side of the center of rotation of the brake disk. This makes it possible to set the inertia of the brake disk to be small. The inertia can be set to be small as described above. Accordingly, in a motorcycle provided with the brake disk, high-speed cornering performance can be significantly enhanced. Further, like the brake disk described in Patent Document 1, it is possible to narrow the circumferential width of the projecting portion projecting inwardly from the sliding disk. This is advantageous in suppressing partial temperature lowering of the sliding portion corresponding to the circumferential position of the projecting portion, reducing a temperature variation of the sliding portion, preventing melting of the sliding portion due to a local temperature rise of the sliding surface, and effectively preventing deposition.

BRIEF DESCRIPTION OF DRAWINGS

FIG. 1(a) is a front view of a brake disk;
FIG. 1(b) is a sectional view taken along the line I-I in FIG. 1(a);
FIG. 2 is a front view of the brake disk in a state that connection pins are removed;
FIG. 3 is an exploded perspective view of connection means and the periphery thereof;
FIG. 4 is an enlarged view of concave and convex engaging portions of a sliding disk and a hub disk;
FIG. 5 is a sectional view taken along the line V-V in FIG. 1(a);
FIG. 6 is a sectional view taken along the line VI-VI in FIG. 1(a);
FIG. 7 is a sectional view taken along the line VII-VII in FIG. 1(a);
FIG. 8 is an exploded perspective view of connection means of another configuration;
FIG. 9 is an elevational sectional view of connection means of another configuration; and
FIG. 10 is an elevational sectional view of connection means of another configuration.

DESCRIPTION OF EMBODIMENTS

In the following, an embodiment of the invention is described referring to the drawings.

Figure 1:
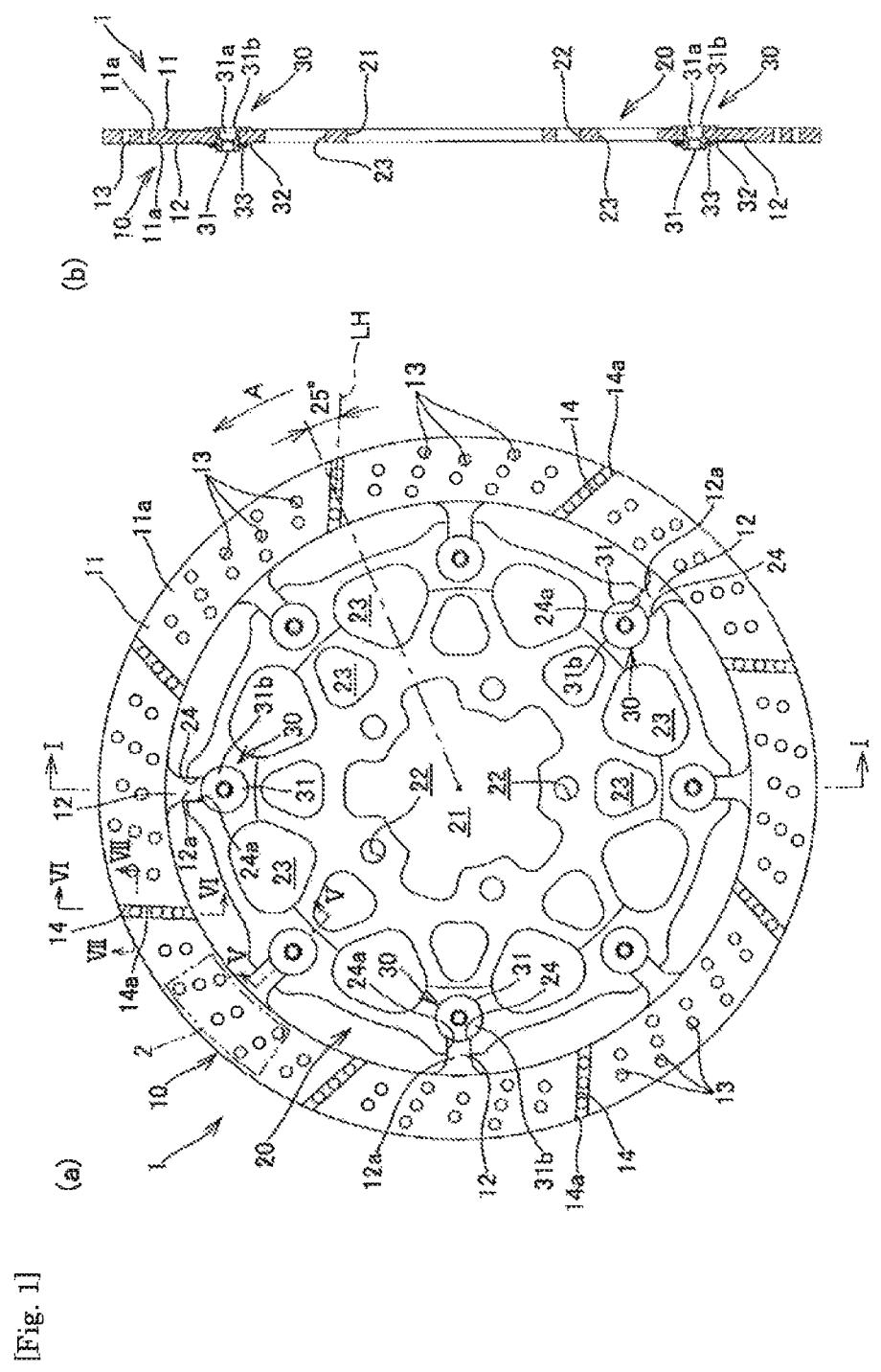

As illustrated in FIG. 1(a) to FIG. 7, a floating brake disk 1 is a brake disk for a motorcycle. The floating brake disk 1 is provided with an annular flat plate-shaped sliding disk 10, a hub disk 20 mounted on the inner side of the sliding disk 10 with a predetermined clearance, and a plurality of connection means 30 for connecting the sliding disk 10 and the hub disk 20 to each other in a floating state. The invention is also applicable to a brake disk other than the brake disk for a motorcycle.

The sliding disk 10 is provided with an annular sliding portion 11 which comes into sliding contact with a brake pad 2. The sliding disk 10 is manufactured by processing a flat metal plate made of stainless steel or carbon steel having excellent heat resistance into the annular-shaped sliding disk 10, followed by subjecting the sliding portion 11 to heat treatment. The diameter and the thickness of the sliding disk 10 may be set as necessary in accordance with e.g. the output of a motorcycle incorporated with the brake disk. For instance, it is possible to use the sliding disk 10 of e.g. 300 mm in diameter and 5 mm in thickness.

The hub disk 20 is made of a light metal material such as aluminum alloy in order to reduce the weight of the brake disk 1. The hub disk 20 is formed into a flat disk shape. A mounting hole 21 for receiving an end of a wheel hub (not illustrated) is formed in the middle portion of the hub disk 20. A plurality of bolt insertion holes 22 for mounting the wheel hub are formed in the hub disk 20 in such a manner as to surround the mounting hole 21. A plurality of lightening holes 23 are formed in the radially intermediate portion of the hub disk 20 circumferentially at an interval. The plate thickness of the hub disk 20 is set to be substantially the same as the plate thickness of the sliding disk 10.

In the brake disk 1 illustrated in FIG. 1(a) to FIG. 7, the sliding disk 10 and the hub disk 20 are disposed on one plane. Alternatively, it is possible to dispose the sliding disk 10 and the hub disk 20 on planes parallel to each other with a certain clearance in the thickness direction (axial direction) of the brake disk 1. Further, the thicknesses of the disks 10 and 20 may be set to be equal to each other, or may be set to be different from each other. Further, the elements other than the connection means 30 of the brake disk 1 may be configured as necessary.

The connection means 30 are disposed between the sliding disk 10 and the hub disk 20 circumferentially at a certain interval. In FIGS. 1(a) and 1(b), the sliding disk 10 and the hub disk 20 are connected to each other by eight connection means 30. Alternatively, it is possible to connect the disks 10 and 20 to each other by connection means 30 of the number other than eight.

Regarding the connection means 30, as illustrated in FIG. 1(a) to FIG. 5, the sliding disk 10 is formed with engaging convex portions 12 projecting from the sliding portion 11 toward the center of rotation of the sliding disk 10 at circumferential positions where the connection means 30 are disposed. Engaging concave portions 24 engagable with the engaging convex portions 12 are formed in the outer periphery of the hub disk 20. An elongated plate-shaped neck portion 12a extending in the radial direction of the sliding disk 10 is formed on the base portion of the engaging convex portion 12. An annular head portion 12b of the diameter D larger than the width W of the neck portion 12a is formed on the distal end of the engaging convex portion 12. An elongated straight portion 24a extending in the radial direction of the hub disk 20 is formed on the outer periphery of the engaging concave portion 24. An oval-shaped locking concave portion 24b extending in the radial direction of the hub disk 20 with a longer length is formed in the inner periphery (on the inner side) of the engaging concave portion 24. The neck portion 12a of the engaging convex portion 12 is engaged with the straight portion 24a of the engaging concave portion 24 to be movable in the radial direction relative to the hub disk 20 and to be unmovable in the circumferential direction relative to the hub disk 20. The head portion 12b of the engaging convex portion 12 is engaged with the locking concave portion 24b of the engaging concave portion 24 to be unmovable in the circumferential direction and to be slightly movable in the radial direction relative to the hub disk 20. In other words, the sliding disk 10 and the hub disk 20 are connected to be unmovable relative to each other in the circumferential direction, and are connected to be slightly movable relative to each other in the radial direction by the eight connection means 30. As described above, the brake disk 1 is configured such that restricting the relative movement in the circumferential direction makes it possible to transmit a braking force acting on the sliding disk 10 to the hub disk 20 without a play to thereby enhance the responsiveness at the time of braking, and connecting the disks 10 and 20 to be slightly movable relative to each other in the radial direction makes it possible to absorb thermal expansion of the sliding disk 10 due to heat generation at the time of braking to thereby prevent warpage of the sliding disk 10.

In the embodiment, the counter of the head portion 12b has a circular shape, and the locking concave portion 24b has an oval shape with a longer length in the radial direction of the hub disk 20. However, as far as the head portion 12b and the locking concave portion 24b are configured such that a relative movement thereof in the circumferential direction of the brake disk 1 is restricted, and only a small relative movement thereof in the radial direction is permitted, as illustrated by connection means 30A in FIG. 8, the contour of a head portion 12Ab of an engaging convex portion 12A may have a quadrangular shape or a polygonal shape other than the quadrangular shape, and a locking concave portion 24Ab of an engaging concave portion 24A may have a rectangular shape with a longer length in the radial direction of the hub disk 20 or a polygonal shape other than the rectangular shape. Further, the maximum width of the head portion 12b may be set to be the same as the width W of the neck portion 12a, or may be set to be smaller than the width W of the neck portion 12a. In the above configuration, setting the diameter of a circumference passing the distal ends of the eight head portions to be slightly larger than the diameter of a circumference passing the inner ends of the eight locking concave portions makes it possible to connect the sliding disk 10 and the hub disk 20 to be slightly movable relative to each other in the radial direction by cooperation of the eight sets of head portions and the locking concave portions.

It is preferable to set the width W of the neck portion 12a to be from 5 to 20 mm in order to sufficiently secure strength and rigidity at the time of braking and to minimize the width. Further, it is preferable to set the projecting length L of the engaging convex portion 12 from the inner periphery of the sliding portion 11 to be from 10 to 75% of the radius R of the inner periphery of the sliding portion 11 in order to minimize the heat capacity of the engaging convex portion 12. Specifically, providing the engaging convex portion 12 projecting inwardly from the sliding portion 11 on the sliding disk 10 is likely to lower the temperature of the inner periphery of the sliding portion 11 at a circumferential position, where the engaging convex portion 12 is formed, by the temperature corresponding to the heat capacity of the engaging convex portion 12. Contrary to the above, the temperature of the sliding portion 11 is likely to rise at a circumferentially intermediate portion between the engaging convex portions 12 adjacent to each other. As a result, the sliding portion 11 may be locally heated to a high temperature, and the high temperature portion may be melted. As described above, in the invention, the width W of the neck portion 12a is minimized, and the heat capacity of the engaging convex portion 12 is minimized to allow the temperature of the sliding portion 11 to rise with a substantially uniform temperature distribution for preventing local melting of the sliding portion 11 as much as possible.

A insertion hole 12c substantially in parallel to the axis of the brake disk 1 is formed in the head portion 12b of the engaging convex portion 12, and a connection pin 31 is mounted in the insertion hole 12c. A tubular trunk portion 31a to be engaged in the insertion hole 12c is formed on the intermediate portion of the connection pin 31. A flange portion 31b of a diameter larger than the diameter of the head portion 12b of the engaging convex portion 12 is formed on one end of the connection pin 31. A washer 32 of a diameter larger than the diameter of the head portion 12b of the engaging convex portion 12 is mounted on the connection pin 31 at a position near the other end of the connection pin 31. A groove portion 31c is formed in the other end of the connection pin 31. A stopper ring 33 constituted of an E-ring for preventing falling of the washer 32 is fixedly mounted in the groove portion 31c to be axially unmovable. The sliding disk 10 and the hub disk 20 are disposed on one plane in such a manner that the sliding disk 10 and the hub disk 20 are unmovable relative to each other in the axial direction of the brake disk 1 by disposing the head portion 12b of the engaging convex portion 12 of the sliding disk 10, and a portion of the hub disk 20 surrounding the locking concave portion 24b between the flange portion 31b of the connection pin 31 and the washer 32 substantially without a clearance in the plate thickness direction. The washer 32 and the groove portion 31c correspond to a restricting portion provided in the connection pin 31.

In this way, unlike the connection pin 31 described in Patent Document 1, it is possible to dispose the connection pin 31 as a heavy member on the side of the center of rotation of the brake disk 1 and to reduce the inertia of the brake disk 1. This is advantageous in enhancing high-speed cornering performance of a motorcycle provided with the brake disk 1.

It is possible to provide connection means having the following configuration, as the connection means 30. Specifically as illustrated by connection means 30B in FIG. 9, a spring member 34 constituted of a belleville spring or a wave washer may be disposed between a washer 32 and a stopper ring 33 to constantly urge disks 10 and 20 so that the disks 10 and 20 are disposed on one plane. Further, as illustrated by connection means 30C in FIG. 10, a groove portion 31c and a stopper ring 33 may be omitted, and a caulking portion 31d may be formed on the other end of a connection pin 31 to lock a washer 32 for preventing falling of the washer 32.

A plurality of lightening holes 13 are formed in the sliding portion 11 with a predetermined pattern in order to enhance heat dissipation of the brake disk 1, to reduce the weight of the brake disk 1, and to clean a sliding surface 11a of the brake pad 2. It is preferable to dispose and distribute the lightening holes 13 uniformly in the sliding portion 11 so that heat dissipation effect and the weight reduction effect are uniformly obtained over the entire circumference of the brake disk 1. Further, it is preferable to dispose the lightening holes 13 circumferentially and radially at an interval so that the entire surface of the sliding surface 11a of the brake pad 2 is cleaned by the opening perimeters of the lightening holes 13 when the brake pad 2 turns on the sliding surface 11a of the brake disk 1 by a certain angle at the time of braking. Specifically, the lightening holes 13 may be formed radially at an interval on radial line segments disposed circumferentially at an interval. Alternatively, the lightening holes 13 may be formed radially at a certain interval on straight lines disposed circumferentially at a certain interval and radially inclined by a certain angle. Further alternatively, the lightening holes 13 may be formed radially at a certain interval on curved lines disposed circumferentially at a certain interval and radially inclined by a certain angle. For instance, in the brake disk 1 illustrated in FIG. 1(a) and FIG. 1(b), it is possible to form twenty-four sets of lightening holes 13 circumferentially i.e. one-hundred and twenty lightening holes 13 in total by disposing three lightening holes 13 and two lightening holes 13 radially at a certain interval, with five lightening holes 13 in total being defined as one set, on forty-eight straight lines LH circumferentially disposed at an interval of 7.5° and passing through the widthwise center of the sliding portion 11 with an inclination of 25° radially. It is preferable to set the diameter of the lightening hole 13 to be from 4 to 10 mm in order to sufficiently secure mechanical strength and braking performance of the brake disk 1. In the brake disk 1 illustrated in FIG. 1(a) and FIG. 1(b), the diameter of the brake disk 1 is set to be 5 mm. Alternatively, it is possible to form slit-like oblong holes other than the round holes as illustrated in FIG. 1(a) to FIG. 3, as the lightening holes 13. The shape, the size, the number, and the pattern of the lightening holes 13 may be set, as necessary, taking into consideration mechanical strength, braking performance, design, and heat dissipation of the brake disk 1.

Eight groove portions 14 on one surface of the sliding portion 11 i.e. sixteen groove portions 14 on both surfaces of the sliding portion 11 in total are formed in a straight line shape or in a curved shape in such a manner as to transverse the sliding portion 11 while spanning the inner periphery and the outer periphery of the sliding portion 11 in such a manner that each groove portion 14 passes the adjacent three lightening holes 13 disposed in correspondence to the circumferentially middle portion between the connection means 30 adjacent to each other. In this way, forming the groove portion 14 in the circumferentially middle portion between the connection means 30 adjacent to each other is preferable in securing a uniform temperature rise over the entire circumference of the sliding portion 11. In other words, the temperature of the sliding portion 11 at a portion where the groove portion 14 is formed is likely to be lowered due to an increase in the surface area of the portion. As described above, the temperature of the sliding portion 11 is likely to rise at a circumferentially intermediate portion between the engaging convex portions 12 adjacent to each other. In view of the above, forming the groove portion 14 in the intermediate portion is preferable for securing a temperature rise of the sliding portion 11 with a uniform temperature distribution and for preventing melting of the sliding surface 11a due to a local temperature rise. The configuration of forming the groove portion 14 for cleaning in correspondence to the circumferentially middle portion between the connection means 30 adjacent to each other for preventing melting of the sliding surface 11a due to a local temperature rise is also applicable to a brake disk provided with connection means 30 having a general configuration.

It is preferable to form the groove portions 14 on both surfaces of the sliding portion 11 in order to uniformly set the braking performance on both surfaces of the sliding portion 11. Alternatively, it is possible to form the groove portions 14 only on one surface of the sliding portion 11. When the groove portions 14 are formed on both surfaces of the sliding portion 11, it is preferable to form the groove portions 14 at the same positions as each other on both surfaces of the sliding portion 11. Alternatively, it is possible to form the groove portions 14 at positions different from each other. Further, it is preferable to set the numbers of groove portions 14 to be equal to each other on both surfaces of the sliding portion 11. Alternatively, the numbers of groove portions 14 may be different from each other. For instance, in FIG. 1(a) and FIG. 1(b), each one of two groove portions 14 disposed adjacent to each other of eight sets of groove portions 14 may be formed on one surface of the sliding portion 11, and the other one thereof may be formed on the other surface of the sliding portion 11. Thus, eight groove portions 14 are formed on each of both surfaces of the sliding portion 11.

An opening portion 14a opened toward the outside is formed in the outer peripheral end of the groove portion 14 so that foreign matter intruded in the groove portion 14 is moved toward the outer periphery of the groove portion 14 by a centrifugal force generated by rotation of the brake disk 1 for discharging the foreign matter through the opening portion 14a. Further, when the groove portion 14 is formed into a straight line shape or a curved line shape with radial inclination by a certain angle, as illustrated in FIG. 1(a) and FIG. 1(b), it is preferable to form the groove portion 14 to incline radially in such a manner that the inner periphery of the groove portion 14 is located on the front side in the rotating direction (illustrated by the arrow A in FIG. 1(a) and FIG. 1(b)) of the brake disk 1 than the outer periphery thereof. The above configuration is advantageous in guiding the foreign matter intruded in the groove portion 14 toward the outer periphery of the brake disk 1 by contact with the brake pad 2 at the time of braking for efficiently discharging the foreign matter to the outside.

It is possible to set the sectional shape of the groove portion 14 in a direction orthogonal to the length direction of the groove portion 14 to any shape. Forming the groove portion 14 into an angled groove shape such as a rectangular shape or a square shape, and forming an inner side surface of the groove portion 14 in the thickness direction of the sliding portion 11 makes it possible to prevent variation of the opening width of the groove portion 14 regardless of wear of the brake disk 1. This is preferable because the above configuration makes it possible to prevent a subtle change in a braking operation due to wear of the sliding portion 11, and to secure a stable operation.

It is possible to set the depth of the groove portion 14 to any depth, as far as mechanical strength necessary for the brake disk 1 is obtainable. The ratio of the groove portion 14 with respect to the thickness direction of the sliding portion 11 is set to be 70% or less, preferably, from 5% to 60%. When the groove portions 14 are formed at the same positions as each other on both surfaces of the sliding portion 11, the sum of the depths of two groove portions 14 as a set on both surfaces of the sliding portion 11 is set to be 70% or less, preferably, from 5% to 60% of the thickness of the sliding portion 11. When the groove portions 14 are formed at positions different from each other on both surfaces of the sliding portion 11, the depth of one groove portion 14 is set to be 70% or less, preferably, from 5% to 60% of the thickness of the sliding portion 11. In the brake disk 1 illustrated in FIG. 1(a) and FIG. 1(b), the depth of the groove portion 14 is set to be 10% (0.5 mm) of the thickness of the sliding portion 11.

It is possible to set the width of the groove portion 14 to a size smaller than the diameter of the lightening hole 13. In the above configuration, however, an angled portion facing the lightening hole 13 is formed at an intersection portion between the groove portion 14 and the lightening hole 13, and the angled portion is likely to be chipped. In view of the above, it is preferable to form the groove portion 14 of the same size as the diameter of the lightening hole 13 or of a size larger than the diameter of the lightening hole 13 to include the lightening hole 13. Further, it is possible to form groove portions 14 of different widths or different depths in combination, and to form groove portions 14 whose width or depth is changed in the intermediate portion in the length direction.

An embodiment of the invention has been described as above. The invention, however, is not limited to the foregoing embodiment. The invention may be modified in various ways as far as such modifications do not deviate from the gist of the invention.

REFERENCE SIGNS LIST

1 Brake disk
2 Brake pad
10 Sliding disk
11 Sliding portion
11a Sliding surface
12 Engaging convex portion.
12a Neck portion
12b Head portion
12c Insertion hole
13 Lightening hole
14 Groove portion
14a Opening portion
20 Hub disk
21 Mounting hole
22 Bolt insertion hole
23 Lightening hole
24 Engaging concave portion
24a Straight portion
24b Locking concave portion
30 Connection means
31 Connection pin
31a Trunk portion
31b Flange portion
31c Groove portion
32 Washer
33 Stopper ring
30A Connection means
12A Engaging convex portion
12Ab Head portion
24A Engaging concave portion
24Ab Locking concave portion
30B Connection means
34 Spring member
30C Connection means
31d Caulking portion

The invention claimed is:

1. A brake disk for use in a motorcycle, comprising:
an annular sliding disk that is formed to be a unitary disk and has a sliding portion which comes into pressing contact with a brake pad;
a hub disk disposed on an inner side of the sliding disk; and
a plurality of connection pins arranged in a circumferential direction of the brake disk, wherein each of the connection pins connects the sliding disk to the hub disk,
wherein the plurality of connection pins includes at least a first connection pin and a second connection pin,
wherein a plurality of engaging convex portions projecting inwardly of the sliding disk are formed on the sliding disk,
wherein each of the engaging convex portions is at a circumferential position corresponding to a position of a respective one of the plurality of connection pins,
wherein the plurality of engaging convex portions includes at least a first engaging convex portion,
wherein the first engaging convex portion is formed to be a single piece of material,
wherein a first engaging concave portion for receiving the first engaging convex portion is formed in an outer periphery of the hub disk,
wherein an insertion hole for the first connection pin is formed in the first engaging convex portion,
wherein a restricting portion for restricting a relative movement between the sliding disk and the hub disk in an axial direction of the brake disk is formed on both ends of the first connection pin,
wherein an elongated plate-shaped neck portion is formed on a base portion of the first engaging convex portion,
wherein a head portion having a width larger than a width of the neck portion is formed on a distal end of the first engaging convex portion,
wherein the first engaging convex portion is formed by the single piece of material having the neck portion and the head portion,
wherein a straight portion engageable with the neck portion is formed on an opening portion of the first engaging concave portion,
wherein a locking concave portion engageable with the head portion is formed in an inner portion of the first engaging concave portion,
wherein the first engaging concave portion is formed by a concave portion having the straight portion and the locking concave portion,
wherein the first engaging concave portion penetrates the hub disk in a thickness direction of the hub disk,
wherein a plurality of groove portions is formed in the sliding portion in such a manner as to transverse the sliding portion while spanning an inner periphery and an outer periphery of the sliding portion,
wherein the plurality of groove portions includes at least a first groove portion,
wherein the first groove portion is formed at a position corresponding to a circumferentially middle portion of the sliding portion between the first connection pin and the second connection pin,
wherein the groove portions are not formed in the sliding portion at positions corresponding to the connection pins.

2. The brake disk according to claim 1, wherein
a flange portion extending on a plane of the hub disk is formed on one end of the first connection pin, and
a washer extending on the plane of the hub disk is mounted on the other end of the first connection pin in such a manner as to avoid disengagement.

3. The brake disk according to claim 1, wherein a length of the first engaging convex portion is set to be from 10 to 75% of an inner diameter of the sliding portion.

4. The brake disk according to claim 1, further comprising:
a spring member disposed between one of the restricting portions of the first connection pin and the hub disk for urging the sliding disk and the hub disk in such a manner that the sliding disk and the hub disk are disposed on one plane.

5. The brake disk according to claim 1, wherein
the plurality of holes is a plurality of lightening holes for reducing the weight of the brake disk, and the first groove portion is formed in such a manner as to pass the lightening holes adjacent to each other.

6. A brake disk for use in a motorcycle, comprising:

an annular sliding disk that is formed to be a unitary disk and has a sliding portion which comes into pressing contact with a brake pad;

a hub disk disposed on an inner side of the sliding disk; and a plurality of connection pins arranged in a circumferential direction of the brake disk, wherein each of the connection pins connects the sliding disk to the hub disk, wherein the plurality of connection pins includes at least a first connection pin and a second connection pin, wherein a plurality of engaging convex portions projecting inwardly of the sliding disk are formed on the sliding disk, wherein each of the engaging convex portions is at a circumferential position corresponding to a position of a respective one of the plurality of connection pins, wherein the plurality of engaging convex portions includes at least a first engaging convex portion, wherein the first engaging convex portion is formed to be a single piece of material, wherein a first engaging concave portion for receiving the first engaging convex portion is formed in an outer periphery of the hub disk, wherein an insertion hole for the first connection pin is formed in the first engaging convex portion, wherein a restricting portion for restricting a relative movement between the sliding disk and the hub disk in an axial direction of the brake disk is formed on both ends of the first connection pin, wherein an elongated plate-shaped neck portion is formed on a base portion of the first engaging convex portion, wherein a head portion having a width larger than a width of the neck portion is formed on a distal end of the first engaging convex portion, wherein the first engaging convex portion is formed by the single piece of material having the neck portion and the head portion, wherein a straight portion engageable with the neck portion is formed on an opening portion of the first engaging concave portion, wherein a locking concave portion engageable with the head portion is formed in an inner portion of the first engaging concave portion, wherein the first engaging concave portion is formed by a concave portion having the straight portion and the locking concave portion, wherein the first engaging concave portion penetrates the hub disk in a thickness direction of the hub disk, wherein a plurality of groove portions is formed in the sliding portion, wherein the plurality of groove portions includes at least a first groove portion, wherein the first groove portion is formed in the sliding portion at a position between the first connection pin and the second connection pin, wherein the groove portions are not formed in the sliding portion at positions corresponding to the connection pins, wherein a plurality of holes is formed in the sliding portion, wherein the plurality of holes includes at least a first plurality of holes, a second plurality of holes, and a third plurality of holes, wherein the first plurality of holes is formed between the first connection pin and the first groove portion, spaced apart from the first connection pin, and spaced apart from the first groove portion, wherein the second plurality of holes is in contact with the first groove portion, wherein the third plurality of holes is formed between the first groove portion and the second connection pin, spaced apart from the first groove portion, and spaced apart from the second connection pin.

\* \* \* \* \*